Oct. 7, 1958 H. C. GOODRICH 2,855,559

VOLTAGE RECTIFYING SYSTEMS

Filed Aug. 19, 1953

2 Sheets-Sheet 1

INVENTOR.
HUNTER C. GOODRICH

BY [signature]

ATTORNEY

Oct. 7, 1958 H. C. GOODRICH 2,855,559

VOLTAGE RECTIFYING SYSTEMS

Filed Aug. 19, 1953 2 Sheets-Sheet 2

INVENTOR.
HUNTER C. GOODRICH

BY [signature]

ATTORNEY 2,855,559

VOLTAGE RECTIFYING SYSTEMS

Hunter C. Goodrich, Collingswood, N. J., assignor to Radio Corporation of America, a corporation of Delaware Application August 19, 1953, Serial No. 375,248

9 Claims. (Cl. 321—8)

The present invention relates to improvements in controlled voltage rectifying systems and more particularly, although not necessarily exclusively, to voltage rectifying systems in which the developed unidirectional potential may be controlled either manually or automatically by means of a control signal.

More directly, the present invention has to do with an improved form of controlled rectifier circuit means and the novel arrangement of semiconductor amplifying devices to provide such means.

In the electronic art the occasion frequently arises for the provision of a controllable direct current voltage source. The controlled direct current potential may be employed as a source of operating power for a power utilization means or may be employed as a direct current control potential for control of a voltage sensitive circuit. An example of this latter application is found in modern day radio receiving circuits embodying automatic gain control features. In such circuits, alternating current components of the received signal are in effect rectified to produce an automatic gain control voltage which is directly applied to control the gain of those amplifier stages in the radio receiver handling the received signal. In an alternative form of automatic gain control circuit with which the present invention is more directly concerned, the amplitude of the received radio signal is utilized to control the rectification of an alternating current whereby to produce a direct current potential whose value is rendered a function of the received signal strength. The resulting voltage is, therefore, suitable as an automatic gain control potential.

The controlled rectification system of automatic gain control is most commonly found in present day television receivers. In many such receivers an alternating current voltage component of the cathode ray beam deflection waveform is rectified to produce an automatic gain control potential having a negative polarity with respect to circuit ground. The rectification of this component, commonly referred to as "deflection flyback" pulse, is in turn controlled in accordance with the peak value of received video signal whereby to render the resulting unidirectional potential suitable for direct use as an automatic gain control voltage.

As is well known in the art, an automatic gain control system for a signal amplifier can be looked upon as a special case of a voltage regulator circuit commonly used in direct current power supplies. In some voltage regulator circuits a sample of the unidirectional potential resulting from alternating current voltage rectification is employed to control the effectiveness of the voltage rectifying action whereby to maintain the unidirectional potential at a predetermined level. It has been the practice in the prior art to control the "effectiveness" of voltage rectifier action by one of two methods, viz., series drop regulation or shunt load regulation.

In the case of the series drop system, either the internal impedance of the rectifier, per se, is controlled or a variable impedance vacuum tube is placed in series with the connection of the rectifier tube to the load circuit. In shunt regulation a variable impedance vacuum tube discharge path is placed in shunt with the load circuit to act as a variable loss element. In the latter case a reduction in the developed potential is accomplished by reducing the internal impedance of the shunt load.

It is clear from an analysis of the shunt voltage regulator circuit that the shunt impedance path may be forced to dissipate considerable power thereby requiring a shunt regulator tube capable of dissipating considerable power, and consequently costly in construction.

The present invention provides a novel voltage rectifying circuit in which the unidirectional potential storage circuit is subjected to charging by alternate opposite polarity excursions of the alternating current waveform about its alternating current axis. In accordance with the present invention, the unidirectional potential storage circuit is subjected to charging by one polarity excursion on an uncontrolled basis while subjected to charging (relative discharging) by opposite polarity excursions on a controlled basis.

In the carrying out of the present invention by means of vacuum tubes, certain minimum circuit costs are involved due to the requirement of at least two conductive paths offering current conduction in opposite directions, one being controlled and the other uncontrolled.

Another feature of the present invention resides in the novel adaptation of semiconductor amplifying devices to accomplish at minimum cost and maximum circuit simplicity, the controlled voltage rectifying functions described above, otherwise possible only by higher cost vacuum tube circuits of greater complexity and in most instances less reliability.

In the utilization of semiconductor amplifying devices according to the present invention, novel advantage is taken of the bidirectional properties of collector circuit conductivity in a transistor device when the base-emitter circuit is forwardly biased. By employing collector circuit forward conductivity for voltage rectifying purposes, reverse collector conductivity may be used as a voltage control means under the control of emitter-base current.

It is therefore, an object of the present invention to provide an improved controlled voltage rectifying circuit.

It is further an object of the present invention to provide a voltage rectifying circuit whose output voltage may be conveniently controlled either manually or automatically in accordance with a predetermined pattern.

It is further an object of the present invention to provide a simple yet effective automatic gain control circuit for use in radio receiving systems.

Also, an object of the present invention is to provide an improved voltage regulator circuit of the shunt regulating type in which power dissipation requirement of the shunt regulator means is minimized and circuit costs otherwise reduced.

It is yet another object of the present invention to provide an improved and simplified voltage rectifying circuit of the controlled variety embodying semiconductor amplifying devices.

It is another object of the present invention to provide an improved automatic gain control circuit for television receivers in which semiconductor amplifying devices may be employed throughout.

A better understanding of the novel operating principles underlying the improvements offered by the present invention, as well as a better insight as to its advantages will be gleaned from a reading of the following specification, especially when taken in connection with the accompanying drawings, in which.

Figure 1:
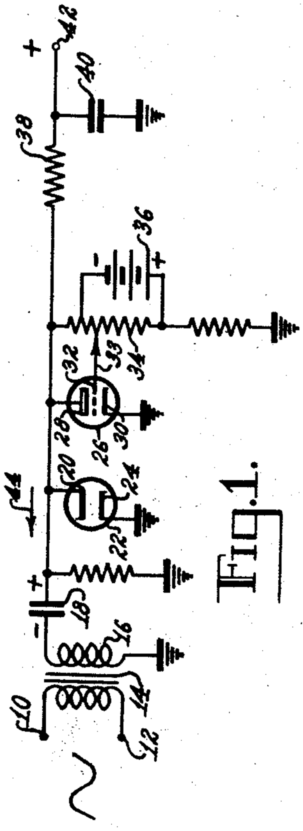
Figure 1 is a schematic representation of an improved form of controlled voltage rectifying system provided by the present invention and embodying vacuum tube elements.

A basic form of the present invention involving the use of electron discharge vacuum tubes is shown in Figure 1. A source of alternating current potential of any desired waveform is indicated as having its terminals at 10 and 12. A transformer 14 having its primary winding connected with the alternating current source provides an isolated source of signal voltage across the secondary winding 16. The lower extremity of the winding 16 is connected with circuit ground potential while the upper extremity of the winding 16 is coupled via capacitor 18 to the cathode 20 of a rectifier tube 22. The anode 24 of the rectifier tube 22 is connected with circuit ground potential. In shunt with the rectifier tube 22 is a control tube 26 having its anode 28 connected with the cathode of the rectifier tube 22. The cathode 30 of the control tube 26 is also connected with circuit ground potential. The control electrode 32 of the control tube 26 is connected with a source of control voltage available across a portion of a bleeder resistor 34 which is connected in shunt with the control tube. A potential source 36 is also connected in shunt with at least a portion of the bleeder resistor 34 to provide a net negative operating bias on the control electrode 32 relative to the cathode 30. A low-pass filter circuit comprising resistor 38 and capacitor 40 is then connected in shunt with the rectifier tube 22 to provide a substantially ripple free direct current output voltage at terminal 42.

In the operation of Figure 1 it will be seen that alternate half-cycles of negative polarity in the signal voltage appearing across the secondary winding 16 will cause conduction in the rectifier tube 22. The direction of current conduction (Franklin flow) will be as indicated by the arrow 44 thereby tending to charge the storage capacitor 18 with the polarity indicated. After peak charging of the capacitor 18 the potential of the upper extremity of the winding 16 will begin to rise in a positive direction on the next positive half-cycle of the applied alternating current, thereby causing the anode 28 of control tube 26 to rise in a positive direction. When the anode 28 becomes positive with respect to the cathode 30 conduction in the control tube 26 will be established, thereby tending to bleed some of the charge from the capacitor 18 and to charge the capacitor 18 with an opposite polarity. The magnitude of this opposite polarity charging effect is a function of the impedance value of the path provided by the tube 26. Thus, if the negative bias on the control electrode 32 is of proper value, the conductivity of the tube 26 will be so low or its anode-cathode path impedance so high that the discharging effect permitted by the tube 26 will be less than the charging effect produced by the diode 22. Under these conditions a net positive voltage will appear at the upper terminal of resistor 34. By properly proportioning the time constant of the resistor 38 and the capacitor 40 with respect to the frequency of the rectified signal, the alternating current component of the residual rectified direct current voltage appearing across the resistor 34 may be eliminated to provide a virtually ripple free direct current output at terminal 42. Correspondingly, should the path impedance provided by the tube 26 be lower than the path impedance provided by tube 22, the polarity of potential developed across capacitor 40 will be reversed.

It will be noted that for a given position of the tap 33 on resistor 34 a self-regulating voltage control action will obtain when the potential across capacitor 40 is of the polarity shown. For example, should the direct current load across the terminal 42 to circuit ground increase thereby tending to reduce the voltage across the resistor 34, the net control electrode-cathode bias of tube 26 will increase and consequently increase the impedance of the tube 26 during the positive going excursion of the rectified signal. This will result in less effective discharge of the storage capacitor 18 and consequently tends to stabilize the positive voltage appearing across the terminal 42 to circuit ground.

Although the embodiment of Figure 1 provides satisfactory controlled voltage rectifying action, it will be immediately apparent that it is best suited to the provision of a power supply potential which is positive with respect to circuit ground. For example, were the polarities of discharge tubes 22 and 26 reversed in an effort to provide a regulated negative potential with respect to circuit ground, a phase reversal in the sense of the voltage applied to the control electrode 32 of tube 26 would have to be made, thereby incurring greater circuit complexity and expense. Moreover, the utilization of electron discharge vacuum tubes requires the provision of heater power to the tubes to produce the necessary internal emission of electrons.

Accordingly, if the principles of the present invention were to be applied to the development of controlled negative potential with respect to circuit ground for use as an automatic gain control potential in radio receiving circuits, the inversion of the circuit of Figure 1 could, in some instances, be considered unfeasible and impracticable because of complexity and cost. It is apparent from the embodiment shown in Figure 1 that two electron discharge tube paths are required in order to achieve the novel voltage control action of the present invention. This is true since in electron discharge tube devices current conduction is generally possible in but a single direction.

It is, therefore, a valuable feature of the present invention that through the utilization of novel circuitry a semi-conductor amplifying device such as a transistor may be made to provide the necessary functions to achieve controlled alternating current rectification.

Figure 2:
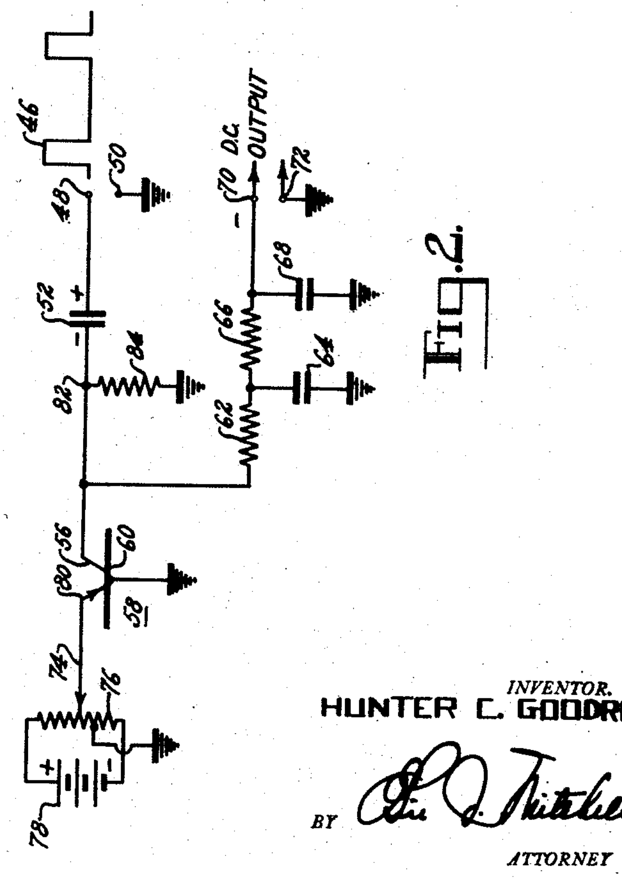
Figure 2 is a schematic representation of one form of controlled voltage rectifying circuit utilizing a semiconductor device in accordance with the present invention.

The fundamental novel circuitry embraced by the present invention which makes possible the utilization of transistor devices for this purpose is illustrated in Figure 2.

In Figure 2 a source of positive going pulses 46 is shown as having a supply terminal 48 which is referenced with respect to circuit ground at terminal 50. The pulses 46 are capacitively coupled via capacitor 52 to the collector electrode 56 of a transistor device 58. The base electrode 60 of the transistor device is shown as connected with circuit ground. A low-pass filter network is also connected with the collector electrode 56 and comprises resistor 62, capacitor 64, resistor 66 and capacitor 68. A direct current output voltage will appear as later described across the output terminals 70 and 72 with terminal 70 being negative with respect to circuit ground terminal 72. A control of the value of this voltage is exercised by the adjustable tap 74 on the resistor 76 connected in shunt with a source of voltage 78 as shown. The lower extremity of the resistor 76 is connected with circuit ground while the tap 74 is connected with the emitter electrode 80 of the transistor device 58. By way of example, the transistor device 58 has been designated as being of the junction P–N–P variety. It is, however, understood that the successful practice of the present invention as described hereinafter is not limited to a particular type or variety of transistor device. Moreover, in discussing transistor circuit arrangements it is found expedient to refer to the emitter electrode, base electrode and collector electrode respectively as merely emitter, base and collector.

In the operation of the embodiment shown in Figure 2 advantage is taken of the fact that in a transistor device there may be observed two distinct forms of conductivity at the collector when the emitter of the transistor device is biased in a forward direction. See an article entitled "Transistors—Theory and Application," Parts 1 and 2, appearing respectively in the March and April 1953 issues of "Electronics." Under the conditions of forward bias on the emitter relative to the base, the collector to ground circuit, as shown in Figure 2, will express conductivity through the emitter when the collector is biased in a reverse direction. In the case of the P–N–P junction transister shown in Figure 2, reverse biasing of the collector 56 would be accomplished by causing the collector to assume a potential value negative with respect to circuit ground or base potential. The conductivity of the circuit path thus provided by the transistor will be under the control of the emitter-base bias current as obtains in normal transistor operation.

However, collector circuit conductivity may be realized in an opposite direction to that attending normal transistor operation. Such conductivity occurs when the collector is biased forwardly with respect to the base at which time a significant conductive path is established between the collector and the base. The conductivity of this circuit path is not under the control of emitter current.

It is, therefore, seen that in the operation of Figure 2 the positive going pulses 46 will cause conduction in the transistor device 58 between collector and base whereby to charge the voltage capacitor 52 with the polarity indicated. After the termination of an individual pulse 46, the average potential at terminal 82 of the collector load resistor 84, will be negative with respect to circuit ground. This immediately establishes normal transistor action in the transistor device 58 whereby conduction is established between the collector 56 and emitter 80 by an amount governed by the bias current flowing through the base-emitter circuit. The bias is in turn controlled by the position of the potentiometer tap 74 on the bleeder 76. This transistor type conduction between collector and emitter will tend to discharge the capacitor 52 as well as to permit recharging of the capacitor 52 with the charge of opposite polarity. However, if the conductivity of the collector-emitter path is made sufficiently low (its resistance high) the "discharge-recharge" influence on capacitor 52 will be of lesser magnitude than the charge influence effected through the facility of the collector-base electrode conduction. There will, therefore, exist at terminal 82 of resistor 84, a net negative potential with respect to circuit ground. Any alternating current component existing at this point may be suitably filtered out by means of a low-pass filter comprising elements 62, 64, 66 and 68 to provide a net negative potential with respect to circuit ground at terminal 70. The value of this potential, as noted hereinabove, is rendered controllable by the position of the tap 74 on the bleeder resistor 76.

Figure 3:
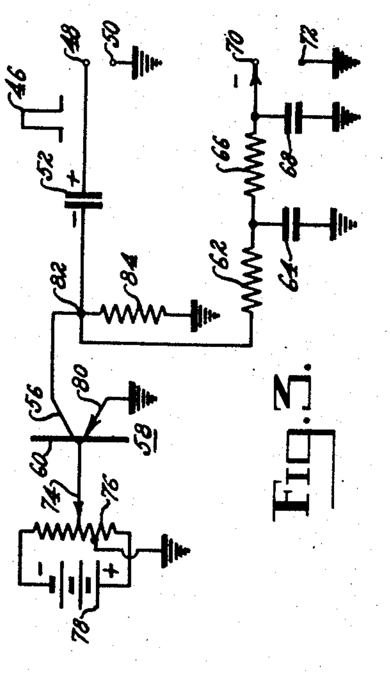
Figure 3 is a schematic representation of still another form of controlled voltage rectifying circuit employing a transistor semiconductor device in accordance with the present invention.

The arrangement in Figure 3 is substantially equivalent to that shown in Figure 2, except that in Figure 3 the transistor device employed is used in a grounded emitter-base input connection. In the interest of simplicity, elements in Figure 3 have been given the same numerical indexes as their counterparts in Figure 2. It will be noted, however, in Figure 3, that the polarity of the voltage source 78 has been reversed in order to provide a proper emitter-base forward bias.

The operation of the embodiment of Figure 3 is substantially the same as that described in connection with Figure 2. The positive going pulse 46 acting through the collector-base circuit of the transistor device 58 (as a consequence of forward bias on the collector during the pulse interval) causes the storage capacitor 52 to charge with polarity indicated. During intervals between pulses 46 the collector-base bias on the transistor device 58 is in the reverse direction so as to establish transistor action with consequent current flow from collector to emitter. The magnitude of this current flow will, of course, depend upon the base-emitter bias current established by position of the tap 74 along the resistor 76. Thus, the average negative potential appearing at terminal 70 and filtered by the network 62, 64, 66 and 68 will be controllable by the position of the tap 74.

Figures 4, 6:
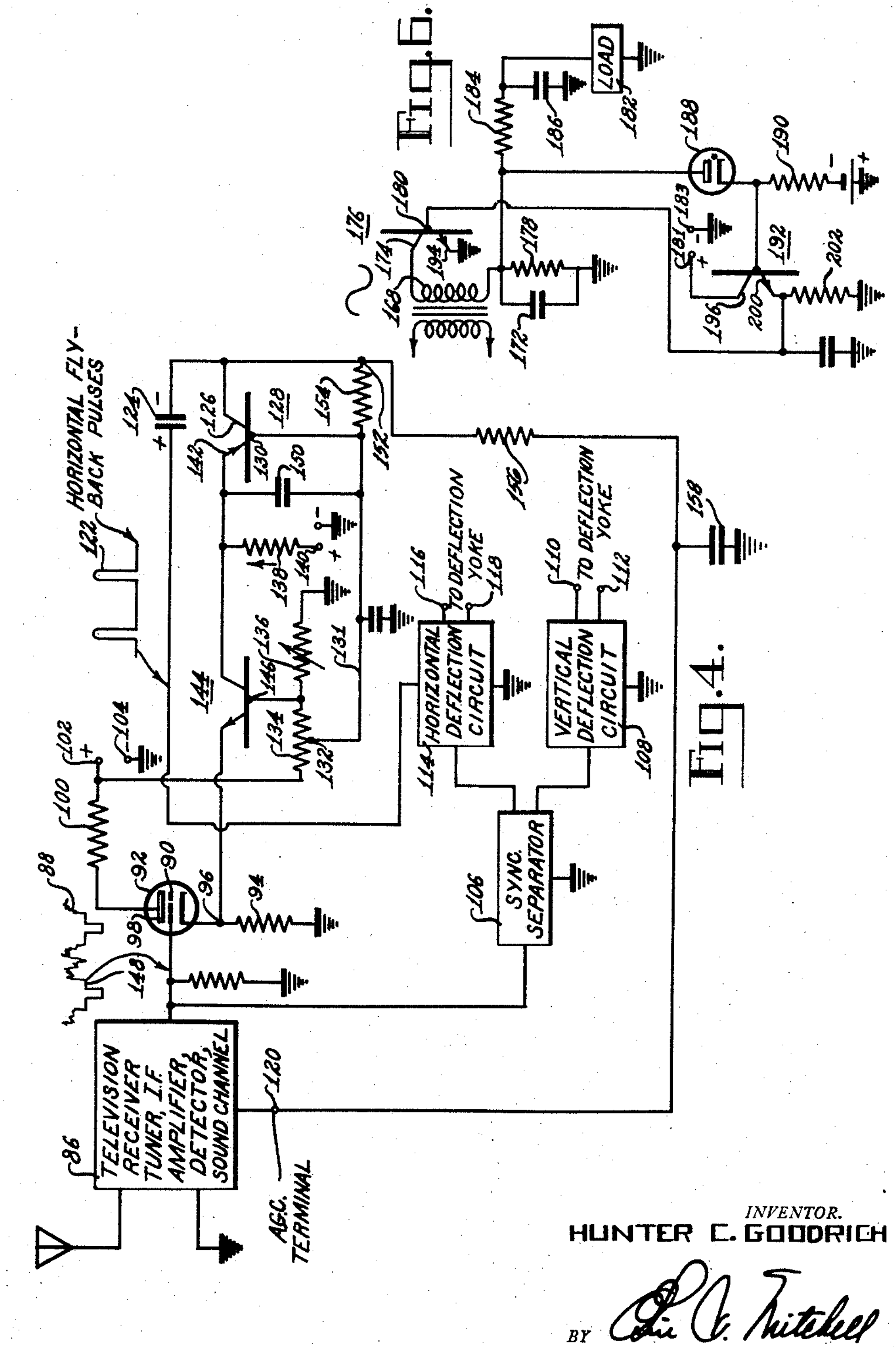
Figure 4 is a combination block and schematic representation of a television receiving system in which another embodiment of the present invention involving transistor elements is utilized as an automatic gain control circuit.
Figure 6 is still another form of voltage regulator circuit utilizing transistor elements in accordance with the present invention.

The application of this novel transistor controlled rectifier action to an automatic gain control circuit in a television receiver is illustrated in the embodiment of the invention shown in Figure 4. Here the conventional components including a tuner, intermediate frequency amplifier, detector and sound channel of a television receiver are indicated by the block 86. The demodulated video signal 88 appearing in the output circuit of the block 86 is indicated as being connected to the control electrode 90 of a cathode follower stage embracing vacuum tube 92. A low impedance source of video signal will, therefore, be established across the cathode follower load resistor 94 connected in the cathode circuit of the vacuum tube 92. The upper extremity 96 of the resistor 94 will, of course, be at some net positive potential with respect to circuit ground, since the anode 98 is connected through a load resistor 100 to a source of power supply potential having a positive terminal at 102 and a negative terminal at 104. Demodulated video signal 88 is also applied to the input circuit of a sync separator circuit 106. The separated vertical synchronizing signal provided by the sync separator circuit 106 is conventionally applied to a vertical deflection circuit 108 for control thereof. Vertical deflection circuit output terminals 110 and 112 are indicated for connection to the vertical deflection coil of a cathode ray beam deflection yoke. Correspondingly, separated horizontal synchronizing signal provided by the sync separator circuit 106 is applied to the horizontal deflection circuit 114 in turn designated to drive the horizontal deflection coil winding indicated for connection to the output terminals 116 and 118.

In accordance with the embodiment of the present invention illustrated in Figure 4, automatic gain control potential for application to the automatic gain control terminal 120 of the receiver is developed by controlled rectification of the horizontal flyback pulses 122 derived in any well known manner from the horizontal deflection circuit 114. The horizontal flyback pulses which occur during the period between the end of one television line and the beginning of the next television line are coupled by a storage capacitor 124 to the collector 126 of transistor device 128. The base 130 of the transistor device 128 is connected via circuit 131 to a point of positive potential 132 along the bleeder network comprising resistor 134 and resistor 136. The network 134 and 136 is connected from the positive power supply terminal 102 to circuit ground. A resistor 138 is in turn connected from a source of positive potential having a terminal at 140 to the emitter 142 of the transistor device 128 so as to apply a forward bias between the emitter and base. By way of example, the transistor device 128 has been symbolized as being equivalent to a P–N–P junction transistor wherein for transistor action the emitter 142 should be established in a positive potential relative to the base 130 for forward bias current to flow.

An amplifying device in the form of another transistor 144 is connected between the source of low impedance video signal across resistor 94 and the emitter 142 of transistor device 128. It is noted that the base 146 of the transistor 144 is connected at a point along the bleeder network 134—136 which is more negative than the upper extremity 96 of the cathode resistor 94 whereby to apply a reverse bias to the transistor 144 which is illustrated as being equivalent to the N–P–N variety. By adjusting the value of element 136 of the bleeder network a net base-emitter reverse bias voltage can be established at a value which will permit a forward bias condition between the emitter and base of the transistor 144 to occur only at signal levels in excess of the blanking level 148 of the video signal 88. Since the collector to base bias voltage for the transistor 144 is reverse by merit of the resistor 138 being connected to a source of potential 140 adequately more positive than the base 146, current flow through the resistor 138 will correspond to clipped synchronizing signal. Capacitor 150 connected in shunt with the resistor 138 is of a value so as to form a time constant with resistor 138 sufficiently longer than the recurrence period of the synchronizing signal so that the voltage at the upper extremity of resistor 138 will represent average sync height. This average sync height, as is well known in the television art, is a function of the received signal strength of a negative modulated television signal, as is standard in the United States. It is, therefore, seen that the base-emitter bias current on the transistor 128 will be a direct function of signal strength.

In the operation of the automatic gain control circuit illustrated in Figure 4, the horizontal flyback pulses 122 will produce charging of the storage capacitor 124 in a manner substantially the same as that described in connection with the embodiment of the invention shown in Figure 2. The flyback pulse 122 extending in a positive going direction will establish forward bias current between the collector and base of the transistor 128 thereby causing charging of the capacitor 124 with the polarity shown. During intervals between the flyback pulses 122, the average potential on the collector 126 relative to circuit ground, will become negative. During this period conductance from collector to emitter in the transistor 128 will be of a value conditioned by base-emitter bias current previously established as a function of signal strength. Thus, the capacitor 124 will effectively be discharged as a direct function of signal strength such that the potential at the right hand terminal 152 of the collector-base load resistor 154 will display a negative potential with respect to circuit ground whose arithmetical value will be directly proportional to received signal strength. The pulse component of the voltage terminal 152 will be filtered out by means of a filter network comprising resistor 156 and capacitor 158 and the resulting voltage applied to automatic gain control terminal 120 of the receiver.

Thus, in the operation of the embodiment shown in Figure 4, should the incoming signal increase in amplitude greater average current will pass through the collector load resistor 138 of transistor 144. This will reduce the net base-emitter bias current on transistor 128 which in turn increases the collector-emitter path resistance during intervals between horizontal flyback pulses 122. This in turn means that the capacitor 124 will be discharged to a lesser extent during the intervals between flyback pulses which will result in a higher negative AGC potential on terminal 120 to reduce the gain of the receiver in compensation of the initial increase in signal strength.

The cathode follower stage 92 has been illustrated as a vacuum tube but may well be replaced by suitable transistor circuitry. Correspondingly, the elements in the blocks 86, 106, 108 and 114 may, in accordance with an article entitled, "The Study of Transistor Circuits for Television," by G. C. Sziklai, R. D. Lohman and G. B. Herzog, appearing on pp. 708–717 of the "Proceedings of the I. R. E." for June 1953, be entirely made up of suitable transistor device circuits.

Figure 5:
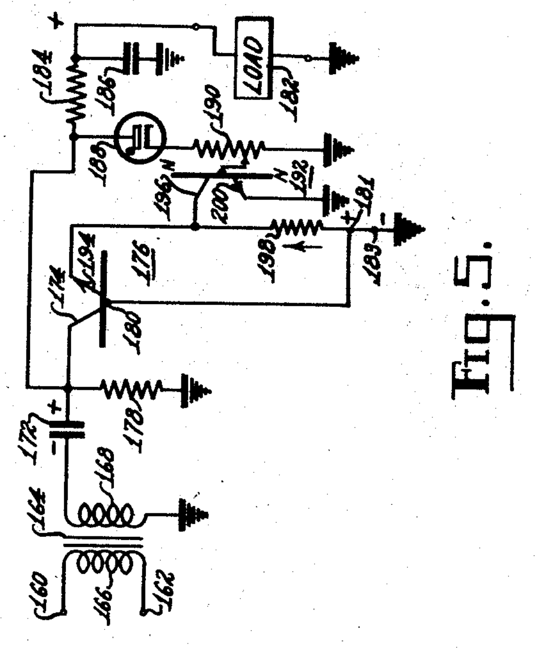
Figure 5 is a schematic representation of a voltage regulator circuit utilizing transistor elements in accordance with the present invention.

A voltage regulating power supply embodying the novel features of the present invention and involving a unique arrangement of transistor elements is shown in Figure 5. Here a source of alternating current input voltage is indicated as having terminals 160 and 162. An isolating transformer 164 has its primary winding 166 connected with this alternating current source. The transformer 164 may have either a step-up or step-down turns ratio depending upon design requirements. The lower extremity of the secondary winding 168 is connected with circuit ground while the upper extremity of the winding is coupled via storage capacitor 172 to the collector electrode 174 of transistor device 176. The transistor device 176 has been indicated as being of a variety corresponding to the N–P–N junction type but may, of course, be a point contact transistor of the "P" type. The collector electrode 174 is connected with circuit ground through a load resistor 178 while the base electrode 180 is also connected with circuit ground via low voltage positive power supply terminal 181 whose companion negative terminal 183 is connected with circuit ground. The resulting positive potential at the upper terminal of resistor 178 is connected with a load circuit 182 through a filter network 184—186 in accordance with action described in connection with embodiments of the invention shown in Figures 2, 3 and 4.

The resulting rectified voltage appearing at the input of the filter circuit 184—186 is sampled by means of the voltage regulator tube 188 connected in series with a dropping resistor 190. An N–P–N type transistor 192 is connected as a grounded emitter-base input amplifier of conventional form whose collector is directly coupled to the emitter 194 of the transistor 176. The collector 196 of the transistor 192 is connected with a reverse biasing potential available at positive power supply terminal 181 through a collector load resistor 198. The emitter 200 of transistor 192 is direct current connected with circuit ground.

In the operation of the arrangement of Figure 5 it will be appreciated that the base-emitter bias of the transistor 176 is in the forward direction by merit of the voltage drop appearing across resistor 198 in turn due to static collector-emitter conduction in the transistor 192. Thus, if the load 182 decreases so as to cause an effective increase in the potential delivered thereto, the base of transistor 192 will become more positive relative to circuit ground. This will increase the forward base-emitter bias current on the transistor and increase collector to emitter current flow in accordance with transistor action. The voltage drop across the resistor 198 will then increase so as to make the collector extremity thereof more negative. This will in turn increase the base-emitter forward bias on transistor 176 so as to increase the conductivity of its collector-emitter path during its action as a transistor as described above. The discharge action provided by the transistor 176 on the capacitor 172 will, therefore, be increased as the potential delivered to the filter 184—186 increases so as to provide a self-regulating and compensating effect.

The voltage regulator system illustrated in Figure 6 is another form of the type arrangement shown in Figure 5. Elements in Figure 6 having counterparts in Figure 5 have been given like reference numerals for purposes of illustrational simplicity.

In Figure 6, however, it will be noted that the storage capacitor 172 is connected between the lower extremity of the transformer secondary winding 168 and circuit ground. Correspondingly, the collector load resistor 178 for transistor 176 is connected in shunt with capacitor 172. A direct connection is, therefore, provided from the upper extremity of transformer winding 168 to the collector 174. The emitter 194 is connected directly with circuit ground while the base 180 is connected with circuit ground potential through an emitter load resistor 202 for the transistor device 192. The transistor device

192 provides substantially the same function as that shown for it in connection with the embodiment of Figure 5. The collector 196 is connected with a low voltage source of collector bias having terminals at 181 and 183. Emitter-collector current will then flow through the emitter load resistor 202 in a magnitude depending upon the voltage drop across resistor 190 located in the cathode circuit of the voltage regulator tube 188.

In the operation of Figure 6, an increase in the voltage applied to load circuit 182 will increase voltage drop across resistor 190 thereby increasing the forward base-emitter bias current in the transistor 192. This will increase the voltage drop across resistor 202 so that the base-emitter bias current in transistor 176 will increase. This in turn will increase the conductivity of the transistor device 176 when operating as a transistor so as to reduce the net voltage applied to load 182 as described hereinabove.

It is, therefore, seen that the present invention provides a new and useful voltage regulating system which is simple in form and readily applicable to automatic gain control circuits in radio receiving systems. The present invention further provides novel transistor circuitry which permits the more general aspects of the invention to be practiced with minimum circuit complexity, size and cost.

What is claimed is:

1. In a controlled alternating current rectifying system, the combination of: a source of alternating current waveform to be rectified; a semiconductor device having respective electrodes operable as an emitter, a collector and base; voltage means connected with said emitter and said base for producing a forward bias current between said base and emitter and thereby to define an emitter-base circuit; impedance means connected between said collector and said base to define a collector-base circuit; a storage capacitor connected from said alternating current source to a point in said collector-base circuit; a low pass filter means connected from a point on said collector-base circuit to an output terminal for said controlled alternating current rectifying system; and means included in said emitter-base circuit for controlling the magnitude of said bias current therethrough and hence the value of direct current potential appearing in said output terminal.

2. In a voltage rectifying circuit, the combination of: a source of alternating current voltage waveform; a semiconductor amplifying device having electrodes respectively corresponding to an emitter, base and collector; forward bias current producing means connected between said emitter and base electrode thereby defining an emitter-base circuit; resistance means connected between said collector and base thereby to define a collector-base circuit; a storage capacitor connected from said alternating current waveform source to a point on said collector-base circuit; and a low-pass filter connected from a point on said collector-base circuit to an output terminal at which rectified voltage is designated to appear.

3. In a voltage rectifying circuit according to claim 2, wherein means are provided in said emitter-base circuit for controlling the magnitude of forward bias current provided by said forward bias current producing means.

4. In a controlled voltage rectifying circuit, the combination of: a source of alternating current voltage to be rectified; a transistor device having electrodes corresponding to an emitter, base and collector; means providing a circuit ground against which said alternating current waveform is referenced; a direct current connection from said base electrode to said circuit ground; controllable forward bias current producing means connected between said emitter and circuit ground; a resistor connected from said collector to circuit ground; a storage capacitor connected from said alternating current waveform source to said collector; a low-pass filter having an input circuit and an output circuit; and connections placing said low-pass filter input circuit between said collector and circuit ground whereby a controllable direct current potential appears at the ouput circuit of said low-pass filter.

5. In a controlled alternating current rectifying system, the combination of: a source of alternating current waveform to be rectified; a semiconductor device having electrodes operable as an emitter, a collector and base; voltage means connected with said emitter and said base for producing a forward bias current between said base and emitter and to define an emitter-base circuit; impedance means connected between said collector and said base to define a collector-base circuit; a storage capacitor connected from said alternating current source to a point in said collector-base circuit; a low-pass filter means connected from a point on said collector-base circuit to an output terminal for said controlled alternating current rectifying system; and amplifying means connected between said collector-base circuit and said emitter-base circuit for controlling the forward base-emitter bias current as a direct function of the potential appearing at said collector electrode.

6. In a voltage regulated power supply system, the combination of: a source of alternating current voltage waveform; a first semiconductor amplifying device having electrodes corresponding to a collector, base and emitter; a circuit ground against which said alternating current voltage waveform source is referenced; a resistor connected from said collector to circuit ground; a capacitor connected from said alternating current voltage source to said collector; a source of positive direct current potential referenced to said circuit grounds; a connection from said base to said positive potential source; a resistor connected from said emitter to said direct current source; a second semiconductor amplifying device having electrodes corresponding to a collector, base and emitter; a connection from said second device collector to said first mentioned device emitter; a direct current connection from said second device emitter to circuit ground; a voltage regulator tube and resistor connected in series to form a combination; connections placing said combination between said first mentioned semiconductor device collector and circuit ground and a direct current connection from said voltage regulator combination resistor and said second semiconductor device base electrode; and low-pass filter means connected from said first device collector to an output terminal for said rectifying system.

7. In a voltage regulated power supply system, the combination of: a source of alternating current voltage; a transformer having a primary winding and a secondary winding, said primary winding being connected across said source; a circuit ground; a first resistor connected from one extremity of said secondary winding to said circuit ground; a capacitor connected in shunt with said first resistor; a first semiconductor amplifying device having electrodes corresponding to an emitter, base and collector; a connection from another point on said secondary winding to the collector of said first amplifying device; a direct current connection from the emitter of said first amplifying device to circuit ground; a second semiconductor amplifying device having electrodes respectively corresponding to an emitter, base and collector; a direct current connection from the base of said first amplifying device to the emitter of said second amplifying device; a second resistor connected from the emitter of said second amplifying device to circuit ground; a capacitor connected in shunt with said second resistor; a source of low voltage direct current potential referenced to circuit ground; a direct current connection from said second amplifying device collector to said low voltage source; a voltage regulator tube and resistor connected in series with one another to form a combination; a connection from the regulator tube extremity of said combination to a point on said first resistor; a direct current path means connected from the resistor extremity of said combination to circuit ground; and a direct current path from said second device base to a point on the resistor of said combination.

8. In a voltage rectifying circuit, the combination of: a source of alternating current voltage waveform; a semiconductor amplifying device having electrodes respectively corresponding to an emitter, base and collector; forward bias current producing means connected between said emitter and base electrode thereby defining an emitter-base circuit; resistance means connected between said collector and base thereby to define a collector-base circuit; a storage capacitor connected from said alternating current waveform source to a point on said collector-base circuit; and voltage utilization means connected in shunt with at least a portion of said collector-base circuit.

9. A controlled voltage rectifying circuit comprising, in combination, a transistor including base, emitter, and collector electrodes, means providing a source of input signals, means including a storage capacitor for applying said signals to said collector electrode, said signals being of a polarity to cause collector-base current flow in said transistor in a reverse direction from normal transistor collector-base current flow and to charge said storage capacitor in a direction which reverse biases said collector electrode in the intervals between application of said input signals, said transistor being adapted to conduct collector-emitter current in the forward direction during said intervals to discharge said capacitor and to charge said capacitor in an opposite direction, and means for deriving a direct-current voltage from said collector electrode.

References Cited in the file of this patent

UNITED STATES PATENTS

| | | |
|---|---|---|
| Re. 14,752 | Arnold | Nov. 18, 1919 |
| 1,982,007 | Logan | Nov. 27, 1934 |
| 2,358,391 | Ford | Sept. 19, 1944 |
| 2,474,580 | Hiehle | June 28, 1949 |
| 2,600,172 | John | June 10, 1952 |
| 2,615,089 | Rogers | Oct. 21, 1952 |
| 2,654,799 | Wendt | Oct. 6, 1953 |
| 2,693,568 | Chase | Nov. 2, 1954 |